United States Patent [19]

McGrady et al.

[11] Patent Number: 5,682,410
[45] Date of Patent: Oct. 28, 1997

[54] METHOD FOR DETERMINING CORE FLOW RATE AND WATER TEMPERATURE/DENSITY IN BOILING WATER REACTOR

[75] Inventors: Joseph Alva McGrady; Heung Tae Kim, both of San Jose, Calif.; Toshihiro Fujii, Yokohama, Japan

[73] Assignee: General Electric Company, San Jose, Calif.

[21] Appl. No.: 531,139

[22] Filed: Oct. 17, 1995

[51] Int. Cl.$^6$ ................................... G21C 17/00
[52] U.S. Cl. ................ 376/246; 376/245; 376/247; 376/254
[58] Field of Search ................ 376/245–247, 376/210, 214, 254

[56] References Cited

U.S. PATENT DOCUMENTS

| | | | |
|---|---|---|---|
| 4,108,720 | 8/1978 | Ibaraki et al. | 376/210 |
| 4,400,343 | 8/1983 | Izumi et al. | 376/210 |
| 4,774,049 | 9/1988 | Impink, Jr. et al. | 376/245 |
| 4,842,806 | 6/1989 | Ohtomi | 376/247 |
| 4,975,239 | 12/1990 | O'Neil et al. | 376/247 |
| 5,524,128 | 6/1996 | Mowry et al. | 376/210 |

*Primary Examiner*—Harvey E. Behrend
*Attorney, Agent, or Firm*—James E. McGinness; Dennis M. Flaherty

[57] ABSTRACT

A method for determining the core flow rate from pump differential pressure method equations and a heat balance equation for determining the temperature and density of the reactor water in the downcomer and lower plenum region. The measured reactor water temperature is used only as an initial estimate for this new method. This allows the first estimate of the core flow to be determined based upon the reactor water density that corresponds to this temperature and the pump differential pressure and pump rotational speed measurements. Then, with this intial core flow measurement value, and other available plant measurements and assumed nominal values for the heat balance equation, revised values for the reactor water temperature and density can be calculated. Using a standard numerical method, such as the successive approximation technique, a more accurate estimate for the reactor water density can be obtained. A more accurate value for the core flow can be determined by the pump differential pressure method core flow equation using this more accurate density estimate. The iterative process is continued until tightly converged values for the calculated core flow and calculated reactor water temperature and density are obtained. By this approach, the overall accuracy of the calculated reactor core flow and the reactor water temperature/density is improved.

6 Claims, 4 Drawing Sheets

METHOD FOR DETERMINING CORE FLOW RATE AND WATER TEMPERATURE/DENSITY IN BOILING WATER REACTOR

FIELD OF THE INVENTION

This invention generally relates to methods for measuring the core mass flow rate in a boiling water reactor (BWR). In particular, the invention relates to methods for measuring the core mass flow rate in a BWR plant that utilizes reactor internal pumps for forced recirculation of the reactor core coolant.

BACKGROUND OF THE INVENTION

The measured core flow is used in boiling water reactors for several functions. These functions include input to the reactor trip system for flow-based reactor trip functions, feedback signals for recirculation flow control, and inputs to the plant process computer for plant performance calculations (i.e., minimum critical power ratio calculations). An accurate estimate of core flow is required to support these critical functions.

In prior art boiling water reactors, external recirculation has been utilized. Simply stated, fluid is withdrawn from the reactor vessel, pumped to high pressures and then discharged in the reactor vessel. Such discharge in the reactor vessel occurs through large jet pumps which include diffusers. These jet pumps entrain the bulk of water within the downcomer region of the reactor and cause the forced circulation. Heretofore, the presence of the external recirculation loops and the jet pumps has made possible relatively accurate estimates of the total flow occurring in the reactor vessel.

More recent designs of boiling water reactors do not employ external recirculation loops and jet pumps to force circulation within the reactor. Advanced boiling water reactors have been designed which include impeller pumps. In one reactor design, an annular deck is placed around the peripheral downcomer region. This annular deck has impeller pumps pumping water downwardly through the periphery of the reactor, e.g., ten pumps circumferentially distributed at 36° intervals. Core flow occurs by having the pumps draw the downcomer fluid downwardly into a plenum below the core. Thereafter, the fluid reverses direction and is forced upwardly through the reactor core plate and then through the core.

Many factors affect the relationship between core flow and the differential pressure across the core plate. These factors include core power, axial power shape, the buildup of debris in the core plate orifices, calibration accuracy and the like. Therefore, trying to estimate core flow as a function of the differential pressure across the core plate is considerably less accurate than methods utilized for measuring core flow in conventional boiling water reactors having external recirculation loops and jet pumps.

An apparatus and process for the accurate core flow measurement and calibration of core flow measurement in an advanced boiling water reactor was disclosed in U.S. Pat. No. 4,975,239. This process was applied to a reactor of the type having internal forced circulation through the fuel core. An annular downcoming region establishes reactor coolant flow downward in the periphery of the reactor vessel and then radially inward and finally upward into the core across a core plate. A differential pressure sensor detecting the pressure difference across the core plate was utilized. This differential pressure sensor has its measurement enhanced by input from local power range monitors inserted in the core. Both the sensed core plate pressure differential and the reactor power are used to predict the core mass flow in the reactor more accurately.

In accordance with the prior art teaching of U.S. Pat. No. 4,975,239, an algorithm was developed for utilizing the core plate pressure differential and the real-time readings from the local power range monitor to accurately gauge overall reactor coolant flow. To ensure accurate calibration, two calibration standards were utilized at steady states of reactor power output and coolant flow. The first calibration standard included the installation of thermocouples adjacent the reactor core plate for measurement of the fluid enthalpy of the coolant as it flows upwardly through the reactor core. The determined enthalpy is utilized in an energy flow balance equation wherein the core flow rate is solved for as an unknown. The second calibration standard utilizes the sensed pressure differential across the annular pump deck of the forced circulation pumps. The two standards are combined in output utilizing a least squares averaging, and the result is combined to calibrate the disclosed algorithm.

In U.S. Pat. No. 4,975,239, a simple fit based on two independent quadratic equations of core plate differential pressure and filtered neutron flux was derived for calculating core flow in the advanced boiling water reactor. The fit equation was determined from thermal hydraulic analysis results. The uncertainty of the core flow calculated from this fit was determined to be less than 5.2% of rated flow at all power levels. The effect of crud and debris buildup throughout the cycle was taken into account when calculating the core flow uncertainty.

The core flow rate calculated from the measured core plate differential pressure and the filtered neutron flux has utility in the following control applications in a BWR having reactor internal pumps: (1) calculation of flow-based thermal power monitor control rod block and scram setpoints; (2) reactor trip system low core-flow scram; (3) selected control rod run-in logic in the recirculation flow control system; and (4) core flow feedback signal in the recirculation flow control system.

The algorithm made up of two independent quadratic equations based on measured core plate differential pressure and reactor power is as follows:

$$M_{CF} = (a + b\,\Delta p_{CP}^{1/2} + c\Delta p_{CP})(d + eP + fP^2)K \quad (1)$$

where P is the % of rated reactor power (filtered neutron flux); $\Delta P_{CP}$ is the core plate differential pressure in psi, and K is a calibration constant for adjusting the fit magnitude to account for crud and debris buildup. The coefficients were determined using core pressure drop data calculated by thermal hydraulic analysis code with the proper advanced boiling water reactor input database deck.

Using a simple quadratic curve fit routine, a quadratic formula for $M_{CF}$ versus $\Delta P_{CP}^{1/2}$ can be determined for each of four sets of data at 100%, 75%, 50% and 25% power (see FIG. 3 for representative data). The core flow results at 75%, 50% and 25% power were divided by the 100% power core flow fit for that data. The same was done to the 100%, 50% and 25% power data using the 75% core flow fit. This was done to determine the accuracy of a single curve (determined at a given power) in predicting the $M_{CF}$ versus $\Delta P_{CP}^{1/2}$ curve at other powers. It was found that the shape of the $M_{CF}$ versus $\Delta P_{CP}^{1/2}$ quadratic calculated with the 75% power data is sufficient to be used at the other power levels and provide curve-fitting accuracy within ±1% of rated flow (for flows between 40% and 120% of rated flow).

The above method of determining the coefficient through analysis using a thermal hydraulics computer program is done prior to plant startup. During plant startup, actual plant data will be collected and the coefficients can be recalibrated based on the actual plant data to enhance the core flow measurement accuracy.

The calibration factor K in Eq. (1) may be adjusted throughout an operating cycle if core flow calibration sources reveal a significant difference in the core flow calculated using the core plate differential pressure. However, since the buildup of crud throughout the cycle is taken into account in the uncertainty calculation, recalibration to account for crud and debris buildup is not necessitated by an increase in core flow uncertainty throughout the operating cycle.

The coefficients in Eq. (1) are determined for a specific reactor utilizing an elaborate computer program for the prediction of reactor core mass flow. As part of the constant determination, it is required that Eq. (1) be calibrated. This calibration must occur not only initially (using the elaborate computer-generated programs), but additionally after the reactor goes into operation.

One of the major contributors to the total core flow measurement uncertainty is the uncertainty associated with the reference core flow value used to calibrate the core flow measurement system. For example, the reactor core mass flow rate for a BWR with internal pumps can be determined using measurements of the pump differential pressure (i.e., the measured difference in the pressure on the discharge flow side of the reactor internal pumps and the pressure on the suction flow side of the reactor internal pumps) and measurement of the individual reactor internal pump rotational speed. Paired pressure gauges sense the pressure differential between a pump's inlet and outlet. For each recirculation pump, a tachometer (or an alternative speed measurement device) is provided to measure the pump's rotational speed. Using these measurements and the density of the water flowing through the reactor internal pumps, the volumetric flow for each pump can be calculated based upon the vendor-supplied head/flow curves for each pump. The total volumetric core flow can then be determined by adding the flow of all the pumps. The total core mass flow rate is obtained by multiplying the total volumetric flow rate by the reactor water density. In the prior art, to determine reactor water density temperature in the lower plenum region of the reactor, temperature measurement devices (e.g., thermocouples) that are located either in a flow path of reactor water that is inside the vessel or a flow path discharged from the downcomer or the lower plenum regions of the reactor vessel (e.g., measurement of reactor vessel bottom drain line flow temperature) are used.

The basic problem to be solved is to provide a method for improving the accuracy of determining the reactor core flow and the reactor water temperature and density values. The main problem with the prior art was that standard temperature measurement devices used for BWR plants are not highly accurate in determining the reactor water temperature and density. As the pump differential pressure method for calculation of the core mass flow rate depends upon the reactor water density, the accuracy of the core flow determined by this method is adversely impacted by the inaccuracy related to the reactor water density value. In addition, for BWR plants that measure the temperature of water flowing from the vessel, there is also a concern that additional inaccuracies may be introduced due to heat loss from the fluid prior to reaching the temperature measurement location and due to potential non-uniform thermal mixing of the fluid temperature being measured (e.g., if cooler water preferentially exists near the location of the bottom drain line, this flow can be cooler than the well-mixed reactor water that flows through the reactor internal pumps). Thus there is a need for a method which solves this problem and provides improved accuracy in determining the core flow rate and the reactor water temperature and density.

U.S. Pat. No. 4,975,239 discloses using the pump differential pressure method to determine the core flow. However, this prior art reference does not address the importance of accurately determining the reactor water density for this method. The pump differential pressure is measured by standard differential pressure measurement instrumentation. The pump rotational speed for each pump is determined using standard speed detection instrumentation. The vendor of the pumps supplies standard volumetric flow Q versus measured head H curves for a family of speed values n. To determine the head value H, the pump deck differential pressure $\Delta P_{PD}$ is divided by the reactor water density $\rho$. The volumetric flow Q for each pump can then be calculated using the measured head H, measured speed n and pump performance curves (i.e., Q as a function of H and n curves). The total volumetric flow $Q_T$ is the sum of the volumetric flow of all the pumps. A typical BWR plant with internal pumps has either eight or ten pumps. Finally, to determine the total core mass flow rate, the total volumetric flow $Q_T$ is multiplied by the reactor water density $\rho$. In accordance with the prior art, the density value is determined based upon the use of standard temperature measurement devices such as thermocouples. The relative accuracies that can be achieved with this type of instrumentation are on the order of 2°–4° C., which results in a corresponding accuracy impact on the determination of core flow of approximately 1.2–2.4% of rated core flow. This has a significant impact on the determination of the overall core flow measurement accuracy, which is around 4–5% of rated core flow.

SUMMARY OF THE INVENTION

The concept of the present invention is to use a combination of the prior art method for determining the core flow rate from the pump differential pressure method equations and a heat balance equation for determining the temperature and density of the reactor water in the downcomer and lower plenum region. The measured reactor water temperature is used only as an initial estimate for this new method. This allows the first estimate of the core flow to be determined based upon the reactor water density that corresponds to this temperature and the pump differential pressure and pump rotational speed measurements. Then, with this initial core flow measurement value, and other available plant measurements and assumed nominal values for the heat balance equation, revised values for the reactor water temperature and density can be calculated. Using a standard numerical method, such as the successive approximation technique, a more accurate estimate for the reactor water density can be obtained. A more accurate value for the core flow can be determined by the pump differential pressure method core flow equation using this more accurate density estimate. The iterative process is continued until tightly converged values for the calculated core flow and calculated reactor water temperature and density are obtained. By this new approach, the overall accuracy of the calculated reactor core flow and the reactor water temperature/density is improved as compared to the prior art method.

DETAILED DESCRIPTION OF THE PREFERRED EMBODIMENT

Figure 2:
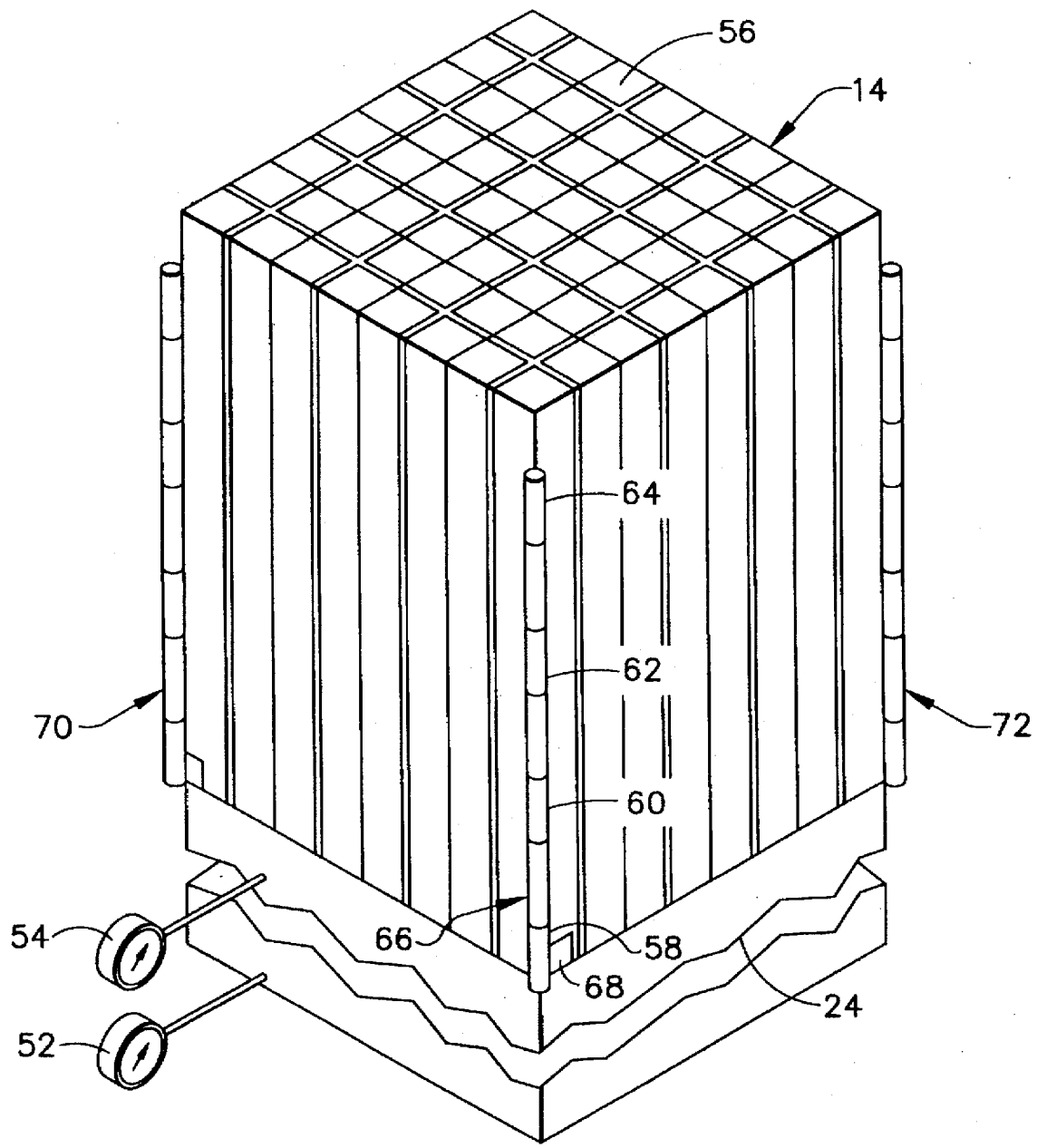
FIG. 2 is a schematic of a section of the reactor core showing the locations of the instrumentation used to measure the core plate differential pressure and the neutron flux in the core, which measurement data is used to estimate the core mass flow rate in accordance with a conventional technique.

Referring to FIG. 2, the core 14 of a boiling water reactor comprises a multiplicity of 2×2 arrays of nuclear fuel assemblies 56. Each array of fuel bundle assemblies is supported at the bottom by a core plate 24. A group of control rod guide tubes (not shown) supports the fuel bundles through the core plate. A pair of pressure gauges 52, 54 sense the pressure difference across the core plate. This differential pressure measurement constitutes an important input to the flow rate determination, as explained in detail hereinabove.

Each group of fuel bundles 56 is monitored by local power range monitors. Four such local power range monitors are shown at 58, 60, 62 and 64 in string 66. Schematically shown attached to string 66 is a thermocouple 68. Likewise, similar local power range monitor strings 70 and 72 monitor the performance of the core. These local power range monitor strings include the local power range monitor neutron sensors. A few of the local power range monitors spaced around the core contain thermocouples 68 to measure core inlet temperature. These thermocouples accurately measure the temperature of the core coolant flowing upwardly in the saturated flow of the reactor coolant that enables an energy balance to take place. This energy balance requires accurate measurement of the upflowing coolant enthalpy and is required for the development of the core flow predicting algorithm disclosed in U.S. Pat. No. 4,975,239.

It is known in the prior art (see, e.g., U.S. Pat. No. 4,975,239) that the core flow rate can be determined from the measured differential pressure across the core plate and the filtered neutron flux (measured by conventional local power range monitors). As part of this determination, the core plate differential pressure and reactor power values must be correlated to reference core flow values, i.e., the core mass flow rate derived from the core plate differential pressure must be calibrated. The differential pressure across the core plate is measured using paired pressure gauges arranged in conventional fashion. Based on the calibration, an estimated core flow rate can be derived from the measured core plate differential pressure and reactor power.

In U.S. Pat. No. 4,975,239, the average of two independent core flow estimates was used as the calibration reference: (1) core flow determined from pump deck differential pressure measurements; and (2) core flow calculated from a steady-state heat balance of the vessel downcomer region. In contrast, the present invention iteratively computes, rather than averages, the pair of independent core flow estimates to arrive at the core flow rate calibration reference.

In particular, the invention uses a combination of the prior art method for determining the core flow rate from the pump differential pressure method equations and a heat balance equation for determining the temperature and density of the reactor water in the downcomer and lower plenum region. The measured reactor water temperature is used only as an initial estimate for this new method. This allows the first estimate of the core flow to be determined based upon the reactor water density that corresponds to this temperature and the pump differential pressure and pump rotational speed measurements. Then, with this initial core flow measurement value, and other available plant measurements and assumed nominal values for the heat balance equation, revised values for the reactor water temperature and density can be calculated. Using a standard numerical method, such as the successive approximation technique, a more accurate estimate for the reactor water density can be obtained. A more accurate value for the core flow can be determined by the pump differential pressure method core flow equation using this more accurate density estimate. The iterative process is continued until tightly converged values for the calculated core flow and calculated reactor water temperature and density are obtained.

The present invention provides a more accurate means for determining the reactor water temperature and density—for the purpose of calibrating the core flow measurement system—than can be achieved using conventional reactor water temperature measurement instrumentation. The same methodology and equations employed for determination of the core flow using the conventional pump differential pressure method is used for this invention. However, the key difference is that an additional heat balance equation is used for final determination of the reactor water temperature and density. The original pump differential pressure method for core flow calculation can be viewed as one equation that is to be used and the heat balance equation as the other equation to be used. The two key unknowns for these two equations are the core mass flow rate and the reactor water density. By using standard numerical iteration methods, a converged solution for the two unknowns can be obtained. The accuracy of the resulting converged solution does not depend on the accuracy of the standard reactor water temperature measurement instrumentation. This new approach improves the relative accuracy of the determination of reactor water temperature to approximately 0.5°–1° C., which results in a corresponding accuracy impact on the core flow determination of approximately 0.3–0.6% of rated core flow. The improved method has a much smaller impact on the determination of the overall core flow measurement accuracy, which is around 4% of rated core flow. The other advantage of this method is that all the measurements needed for the heat balance equation are available from available plant measurement instrumentation (i.e., no new measurement instrumentation is required for this method).

The method in accordance with the invention employs the basic pump differential pressure measurement method core flow calculation equations as known in the prior art. Namely, the pump differential pressure $\Delta P$ is determined based upon the measured values from four differential pressure instruments. A standard approach for determining the pump deck differential pressure $\Delta P_{PD}$ from these four measured values is to disregard the highest and lowest measured values and use the average of the other two measured values. Using the subscript j to denote the j-th reactor internal pump, where j ranges from 1 to 10 for a BWR plant with 10 pumps, the measured speed for pump j is denoted $n_j$. Finally, the reactor water density $\rho$ is the remaining required value for the core flow calculation. For this approach, the measured reactor water temperature, obtained using existing plant instrumentation, is only used as an initial estimate for the reactor water density. In contrast, in accordance with the prior art method this density value was adopted as the final value in calculating the core flow.

Now with the measured differential pressure $\Delta P_{PD}$, the head H is determined by dividing the pump differential pressure $\Delta P_{PD}$ by the reactor water density value $\rho$ (i.e., $H = \Delta P_{PD}/\rho$). The pump vendor supplies pump volumetric flow $Q_j$ performance curves that depend on the measured pump head H and the measured pump speed $n_j$. This functional relationship can be represented as:

$$Q_j = Q_j(H, n_j) \tag{2}$$

where $Q_j(H, n_j)$ represents the supplied performance curves for the j-th pump. The total volumetric flow $Q_T$ is obtained by adding the volumetric flow of all pumps, i.e., if there are 10 reactor internal pumps, then:

$$Q_T = \sum_{j=1}^{10} Q_j \tag{3}$$

Finally, the total core mass core flow rate $M_{CF}$ is determined by multiplying the total volumetric flow rate by the reactor water density $\rho$, i.e., $$M_{CF} = \rho Q_T \tag{4}$$

The second main equation used in accordance with the present invention is the result of simplifying the conservation of mass and energy equations for the down-comer and lower plenum regions of the reactor. The derivation of the key heat balance equation is as follows.

Figure 3:
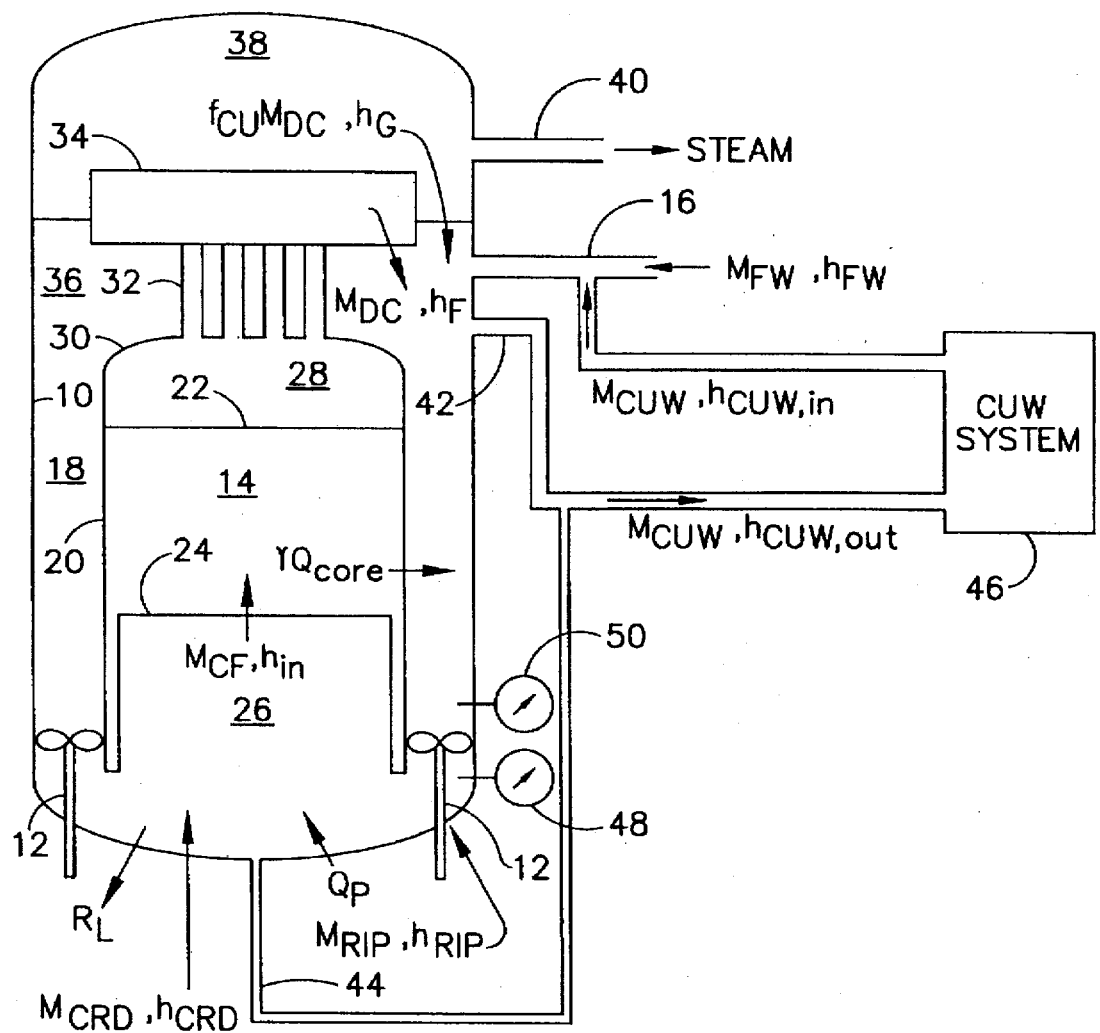
FIG. 3 is a schematic of a reactor pressure vessel, with the key flow paths relevant to the downcomer/lower plenum heat balance being indicated by arrows.

FIG. 3 is a simplified depiction of a reactor pressure vessel (RPV) 10 of a BWR having a multiplicity of internal pumps 12 for producing recirculating flow of coolant through the reactor core 14. Feedwater is admitted into RPV 10 via a feedwater inlet 16 and a feedwater sparger (not shown), which is a ring-shaped pipe having suitable apertures for circumferentially distributing the feedwater inside the RPV. The feed-water from the sparger flows downwardly through the downcomer annulus 18, which is an annular region between RPV 10 and the core shroud 20. Core shroud 20 is a stainless steel cylinder surrounding the nuclear fuel core 14. The core is made up of a plurality of fuel bundle assemblies (not shown). Each array of fuel bundle assemblies is supported at the top by a top guide 22 and at the bottom by a core plate 24. The core top guide 22 provides lateral support for the top of the fuel assemblies and maintains the correct fuel channel spacing to permit control rod insertion.

The water flows through downcomer annulus 18 to the core lower plenum 26. The water subsequently enters the fuel assemblies, wherein a boiling boundary layer is established. A mixture of water and steam enters core upper plenum 28 under the shroud head 30. Vertical standpipes 32 atop shroud head 30 are in fluid communication with core upper plenum 28. The steam-water mixture flows through standpipes 32 and enters steam separators 34, which are of the axial-flow centrifugal type. The separated liquid water becomes a downflow (called the "downcomer saturated liquid flow") that mixes with feedwater in the mixing plenum 36. This mixture then returns to the core 14 via the downcomer annulus 18. The steam passes through steam dryers (not shown) and enters steam dome 38. The steam is conducted from the RPV via steam outlet 40.

The BWR also includes a multiplicity of internal pumps 12 which provide the forced recirculation flow through the core necessary to attain the required power density. The internal pumps are circumferentially distributed around the core shroud 20. The water is pumped from the lower end of the downcomer annulus 18 and forced by the internal pumps into the lower plenum 26. Pressure sensing lines 48 and 50 provide for measurement of the pump differential pressure $\Delta P_{PD}$. In addition, water is extracted from the RPV via lines 42 and 44 and sent to the reactor water cleanup system 46. The cleaned-up water is then returned to the RPV via the feedwater line 16.

Figure 1:
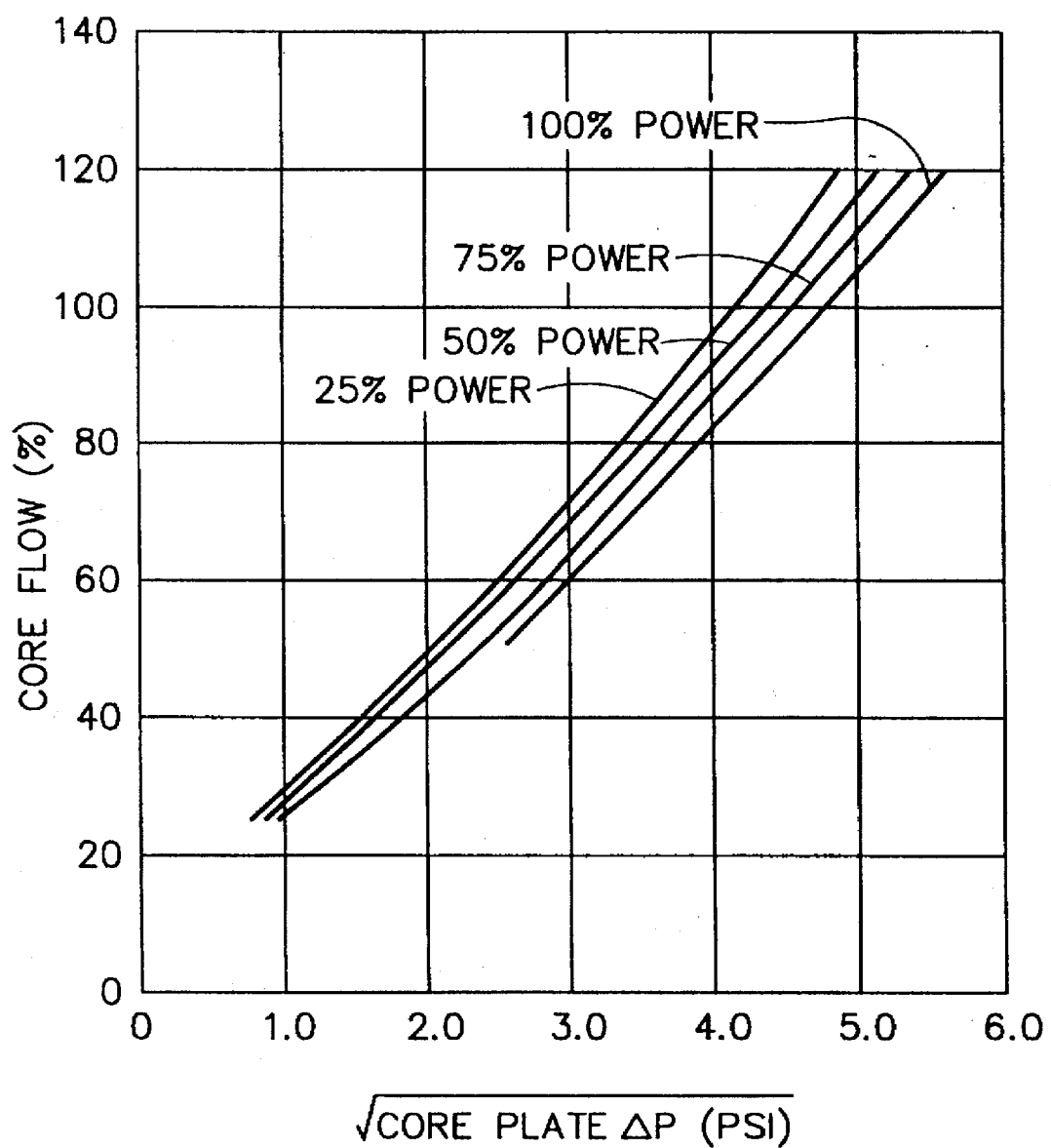
FIG. 1 is a representative plot of the core flow in percent versus the square root of the core plate differential pressure, discrete curves for the particular power rates being illustrated to show the changing resistances.

FIG. 1 also indicates the key flow paths relevant to the downcomer/lower plenum heat balance. The "M" values are mass flow rates, with subscripts being used to identify the particular inlet or outlet flow being considered. The "h" values, with corresponding subscripts, are enthalpy values associated with each flow. The remaining terms are associated with either a direct heat addition or heat loss effect.

The basic idea of the heat balance method in accordance with the invention is to use steady-state conservation of mass and energy equations for the downcomer/lower plenum region of the RPV to derive an equation for the core flow (or alternatively, for the reactor water inlet enthalpy, if core flow is known). The definitions of the relevant terms to be considered are as follows: $M_{DC}$ is the mass flow rate of the saturated liquid flow from the separators to the downcomer (in lbm/hr); $h_F$ is the enthalpy of the saturated liquid flow from the separators to the downcomer (in Btu/lbm); $f_{CU}$ is the carryunder steam fraction (i.e., saturated vapor mass flow rate relative to saturated liquid flow rate); he is the enthalpy of the saturated vapor flow (i.e., carryunder flow) to the downcomer (in Btu/lbm); $h_{FG}$ is the saturated water heat of vaporization (in Btu/lbm); $h_X = [h_F + f_{CU} h_{FG}]$ is the effective enthalpy of downcomer flow from the separators and upper plenum; $M_{FW}$ is the mass flow rate of the feedwater flow to the reactor vessel (in lbm/hr); $h_{FW}$ is the enthalpy of the subcooled liquid flow to the reactor vessel (in Btu/lbm); $M_{CUW,in}$ is the mass flow rate of the reactor water cleanup (CUW) return flow to the reactor vessel (in lbm/hr); $h_{CUW,in}$ is the enthalpy of the subcooled CUW return flow to the reactor vessel (in Btu/lbm); $M_{CUW,out}$ is the mass flow rate of the CUW suction flow from the reactor vessel (in lbm/hr); $h_{CUW,out}$ is the enthalpy of the subcooled CUW suction flow from the reactor vessel (in Btu/lbm); $M_{RIP}$ is the mass flow rate of the reactor internal pump (RIP) purge flow to the reactor vessel (in lbm/hr); $h_{RIP}$ is the enthalpy of the subcooled RIP purge flow to the reactor vessel (in Btu/lbm); $M_{CRD}$ is the mass flow rate of the CRD purge flow to the reactor vessel (in lbm/hr); $h_{CRD}$ is the enthalpy of the subcooled CRD purge flow to the reactor vessel (in Btu/lbm); $M_{CF}$ is the mass flow rate of the core inlet flow (in lbm/hr); $h_{in}$ is the enthalpy of the core inlet flow to the reactor core region (in Btu/lbm); $Q_P$ is the total energy added to the downcomer/lower plenum region by the operating RIPs (in watts); $R_L$ is the thermal heat loss from the downcomer/lower plenum region of the vessel (in watts); $\gamma$ is the thermal power that corresponds to gamma/neutron heat addition to the downcomer/lower plenum region when the reactor is at rated power condition (in watts); $Q_{core}$ is the fraction of rated core thermal power; and $C_1$ is a conversion constant (used to convert watts to Btu/hr)=3.413 Btu/W-hr.

The conservation of mass equation for the downcomer/lower plenum (i.e., total mass flow rate into this region equals total mass flow rate out of this region) can be written as follows:

$$M_{DC}(1+f_{CU}) + M_{FW} + M_{CUW,in} + M_{RIP} + M_{CRD} = M_{CUW,out} + M_{CF} \tag{5}$$

The conservation of energy equation for the downcomer/lower plenum (i.e., total energy addition rate into this region equals total energy loss rate out of this region) can be written as follows:

$$C_I \gamma Q_{core} + C_I Q_P + M_{DC}(h_F + f_{CU}h_G) + M_{FW}h_{FW} + \qquad (6)$$
$$M_{CUW,in}h_{CUW,in} + M_{RIP}h_{RIP} + M_{CRD}h_{CRD} =$$
$$C_I R_L + M_{CUW,out}h_{CUW,out} + M_{CF}h_{in}$$

The conservation of mass equation [Eq. (5)] can be rearranged to obtain:

$$M_{DC}(1+f_{CU}) = M_{CUW,out} + M_{CF} - M_{FW} - M_{CUW,in} - M_{RIP} - M_{CRD} \quad (7)$$

By combining and rearranging the conservation of energy equation [Eq. (6)] and noting that $h_G = h_F + h_{FG}$, we obtain:

$$C_I[\gamma Q_{core} + Q_P - R_L] + M_{DC}(1 + f_{CU})h_F + M_{DC}f_{CU}h_{FG} + \quad (8)$$
$$M_{FW}h_{FW} + M_{CUW,in}h_{CUW,in} + M_{RIP}h_{RIP} + M_{CRD}h_{CRD} =$$
$$M_{CUW,out}h_{CUW,out} + M_{CF}h_{in}$$

Using Eq. (7), substituting the form for $M_{DC}(1+f_{CU})$ on the right-hand side of Eq. (8), and rearranging terms yields:

$$C_I[\gamma Q_{core} + Q_P - R_L] + M_{DC}f_{CU}h_{FG} + M_{FW}[h_{FW} - h_F] + \quad (9)$$
$$M_{CUW,in}[h_{CUW,in} - h_F] + M_{RIP}[h_{RIP} - h_F] +$$
$$M_{CRD}[h_{CRD} - h_F] = M_{CUW,out}[h_{CUW,out} - h_F] + M_{CF}[h_{in} - h_F]$$

An expression for $M_{DC}$ can be obtained from Eq. (7):

$$M_{DC} = \frac{M_{CUW,out} + M_{CF} - M_{FW} - M_{CUW,in} - M_{RIP} - M_{CRD}}{(1+f_{CU})} \quad (10)$$

The expression for $M_{DC}f_{CU}$ can be written as:

$$M_{DC}f_{CU} = \frac{f_{CU}}{(1+f_{CU})} [M_{CUW,out} + \quad (11)$$
$$M_{CF} - M_{FW} - M_{CUW,in} - M_{RIP} - M_{CRD}]$$

The value of $f_{CU}$ is $<<1$ (e.g., $\approx 0.001$). Since $f_{CU}/(1+f_{CU}) \cong f_{CU}$, $M_{DC}f_{CU}$ can be approximated, with negligible error, as:

$$M_{DC}f_{CU} \cong f_{CU}[M_{CUW,out} + M_{CF} - M_{FW} - M_{CUW,in} - M_{RIP} - M_{CRD}] \quad (12)$$

Using Eq. (8), substituting the form for $MD_{fCU}$ on the right-hand side of Eq. (12), and rearranging terms, we get:

$$C_I[\gamma Q_{core} + Q_P - R_L] + M_{FW}[h_{FW} - h_F - f_{CU}h_{FG}] + \quad (13)$$
$$M_{CUW,in}[h_{CUW,in} - h_F - f_{CU}h_{FG}] +$$
$$M_{RIP}[h_{RIP} - h_F - f_{CU}h_{FG}] + M_{CRD}[h_{CRD} - h_F - f_{CU}h_{FG}] =$$
$$M_{CW,out}[h_{CWU,out} - h_F - f_{CU}h_{FG}] + M_{CF}[h_{in} - h_F - f_{CU}h_{FG}]$$

All terms in square brackets in Eq. (13) involving enthalpy are negative, so rearranging these terms to all be positive when evaluated, we get:

$$C_I[\gamma Q_{core} + Q_P - R_L] + M_{CF}[h_F + f_{CU}h_{FG} - h_{in}] + \quad (14)$$
$$M_{CUW,out}[h_F + f_{CU}h_{FG} - h_{CUW,out}] =$$
$$M_{FW}[h_F + f_{CU}h_{FG} - h_{FW}] + M_{RIP}[h_F + f_{CU}h_{FG} - h_{RIP}] +$$
$$M_{CRD}[h_F + f_{CU}h_{FG} - h_{CRD}] + M_{CUW,in}[h_F + f_{CU}h_{FG} - h_{CUW,in}]$$

Another simplifying assumption is that for power range operation (the only operating condition, in accordance with the invention, for which the heat balance equation is used), the CUW inlet and outlet flows are equal. Thus, we define a new term $M_{CUW} = M_{CUW,in} = M_{CUW,out}$, which is the steady-state CUW system flow during power operation. Then Eq. (14) can be simplified to the following:

$$C_I[\gamma Q_{core} = Q_P - R_L + M_{CF}[h_F + f_{CU}h_{FG} - h_{in}] = \quad (15)$$
$$M_{FW}[h_F + f_{CU}h_{FG} - h_{FW}] + M_{RIP}[h_F + f_{CU}h_{FG} - h_{RIP}] +$$
$$M_{CRD}[h_F + f_{CU}h_{FG} - h_{CRD}] + M_{CUW}[h_{CUW,out} - h_{CUW,in}]$$

Eq. (15) can be rearranged so that the only terms involving $M_{CF}$ and $h_{in}$ are on the left-hand side:

$$M_{CF}[h_F + f_{CU}h_{FG} - h_{in}] = M_{FW}[h_F + f_{CU}h_{FG} - h_{FW}] + \quad (16)$$
$$M_{RIP}[h_F + f_{CU}h_{FG} - h_{RIP}] + M_{CRD}[h_F + f_{CU}h_{FG} - h_{CRD}] +$$
$$M_{CUW}[h_{CUW,out} - h_{CUW,in}] + C_I[R_L - \gamma Q_{core} - Q_P]$$

The foregoing equation represents the basic downcomer/lower plenum heat balance equation that can be rearranged to calculate core flow or core inlet enthalpy (assuming the other terms are known or measured).

To simplify the form of this equation, we can define a new quantity $h_X = [h_F + f_{CU}h_{FG}]$, which is the effective enthalpy of downcomer flow from the separators and upper plenum. Then Eq. (13) can be rewritten as:

$$M_{CF}[h_X - h_{in}] = M_{FW}[h_X - h_{FW}] + M_{RIP}[h_X - h_{RIP}] + M_{CRD}[h_X - h_{CRD}] + \\ M_{CUW}[h_{CUW,out} - h_{CUW,in}] + C_I[R_L - \gamma Q_{core} - Q_P] \quad (17)$$

Thus the final equation for calculating core flow from the heat balance equation becomes:

$$M_{CF} = (M_{FW}[h_X - h_{FW}] + M_{RIP}[h_X - h_{RIP}] + M_{CRD}[h_X - h_{CRD}] + M_{CUW} \\ [h_{CUW,out} - h_{CUW,in}] + C_I[R_L - \gamma Q_{core} - Q_P])/(h_X - h_{in}) \quad (18)$$

and the final equation for calculating core inlet flow enthalpy from the heat balance equation becomes:

$$h_{in} = h_X - (M_{FW}[h_X - h_{FW}] + M_{RIP}[h_X - h_{RIP}] + M_{CRD}[h_X - h_{CRD}] + M_{CUW} \\ [h_{CUW,out} - h_{CUW,in}] + C_I[R_L - \gamma Q_{core} - Q_P])/M_{CF} \quad (19)$$

Thus, the key heat balance equation used in the method of the present invention can be used to determine the enthalpy $h_{in}$ of the core inlet flow in terms of the core mass flow rate determined from the pump differential pressure method and other plant terms that can be obtained from plant measurements or by using nominal assumed values.

The most important terms in the heat balance equation can be obtained from existing plant measurements. These terms include the following: $h_F$, $h_{FG}$, $M_{FW}$, $h_{FW}$, $M_{CUW}$, $h_{CUW,in}$, $h_{CUW,out}$, $M_{CRD}$, $h_{CRD}$, and $Q_{core}$. For example, the saturated steam properties, $h_F$ and $h_{FG}$, are obtained by using the measured vessel dome pressure and the ASME steam table properties for saturated steam at this pressure. The remaining terms in the heat balance equation, i.e., the carryunder steam fraction $f_{cu}$, the heat loss $R_L$ from the reactor, and the gamma/neutron heating fraction $\gamma$, can be calculated using assumed nominal values that apply for reactor power operation. The contribution of the assumed values to the accuracy of determination of the core inlet enthalpy $h_{in}$, as compared to the measured terms, is insignificant. Therefore, the accuracy of determination of $h_{in}$ is dominated by the impact of the accuracy of the terms obtained from plant measurements.

$h_F$ and $h_{FG}$ are properties of saturated steam and only depend on the saturation pressure for the liquid and vapor entering the downcomer region from the upper area of the reactor pressure vessel. This area is called the dome area of the vessel and special pressure measurement nozzles are provided on the vessel (located to sense the pressure in this region). Associated with each measurement nozzle is an instrument sensing line that is connected to each nozzle and run through the primary containment to a standard pressure-sensing transducer that is located in an instrument rack outside the primary containment. This approach allows the pressure transducer to be located in a low-radiation area that can be accessed during plant operation. The pressure transducer is calibrated to provide a linear indication of the corresponding pressure in the dome area of the vessel. Typical pressure transducers will provide a 4 to 20 mA signal corresponding to the low and high pressure of the calibrated pressure range (an example range might be 850 psig to 1050 psig). The 4 to 20 mA signal can be converted to a voltage signal (e.g., 1 to 5 $V_{DC}$ signal) that is then converted to a corresponding digital signal (e.g., a 14-bit representation of the continuous signal) using an analog-to-digital converter. Then the digital representation can be transmitted by a multiplexing system to the main plant process computer system. This computer system can read the digital representations of the reactor dome pressure and a computerized representation of the ASME Steam Table Properties to determine the $h_F$ and $h_{FG}$ corresponding to the measured dome pressure. There are generally redundant measurements of the reactor dome pressure (e.g., at least 3 or 4 similar measurements). The computer system can check if all the redundant measurements are valid (e.g., are reasonably close to each other), disregard any measurements that are not considered valid and use the average of the remaining measurements as the best estimate of the vessel dome pressure. Then this value will be used for determining the steam properties, $h_F$ and $h_{FG}$.

$M_{FW}$ and $h_{FW}$ are two other key plant measurements for the heat balance equations. For a typical plant there are two final large piping runs through which feedwater flow travels to be injected into the reactor vessel. One piping run is called "Line A" and the other "Line B". During normal power operation, approximately half of the total feedwater flow travels through each of the two lines. In each piping line, there is a feedwater flow element (e.g., a venturi type flow element) and multiple measurements (e.g., two is typical for each line) of the temperature of the water flowing through each line. The temperature measurement devices are placed inside thermowells that are installed on the feedwater piping. Inside the thermowells, standard temperature measurement devices are installed (e.g., thermocouples or resistance temperature devices). Signal wiring is run from these devices to corresponding signal conditioning equipment that can provide a corresponding digital representation (e.g., 14 bits) of the measured temperature. Then this digital representation can be transmitted to the process computer system by a multiplexing system and the corresponding measured temperature determined. $h_{FW}$ is determined using the average of all the valid temperature measurements from both feedwater lines (e.g., typically the average of four separate readings). $h_{FW}$ primarily depends on the measured temperature and is determined from the ASME Steam Table properties for compressed water using a typical expected pressure value for the feedwater line at rated reactor operating conditions. At lower core power and flow conditions, the real pressure will be somewhat lower; but the assumption of constant pressure for determining $h_{FW}$ causes an insignificant difference in the results of the heat balance equation because the compressed water enthalpy values primarily depend on temperature. $M_{FW}$ is determined by adding the sum of the feedwater flows through lines A and B. For each line, the flow is determined by using the measured differential pressure of the flow element and the average temperature reading for that line. The average temperature reading is calculated by the computer system based upon the temperature measurement values already discussed. Then, the density $\rho_{line}$ of the water for that line can be determined from this average line temperature and the ASME Steam Table properties for compressed water. The pressure value assumed can be the expected pressure for rated reactor operating conditions (because the density primarily depends on the measured temperature, not pressure). The differential pressure reading from the flow element is obtained by routing instrument lines from the high and low pressure measurement ports on the flow element to a standard differential pressure transducer. The transducer output (typically 4 to 20 mA) is a linear representation of the calibrated differential pressure range for that flow element. Associated signal conditioning and transmission equipment as previously described allow the digital representation (e.g., 14 bits) of this signal to be provided to the process computer system. Then the feedwater flow for each line can be calculated based upon the standard equation that applies for compressed water flow through a flow element:

$$\text{Feedwater Flow of One Line} = \frac{C\sqrt{\rho_{line}}\sqrt{\Delta p_{line}}}{\sqrt{K_{FE}}} \qquad (20)$$

where $K_{FE}$ and C are known constants that depend only on the flow element used; $\rho_{line}$ is the density for this line (determined from measured line temperatures and the compressed water properties); and $\Delta P_{line}$ is the differential pressure measured for the flow element in that line. $M_{FW}$ is determined by adding the sum of the feedwater flowthrough determined separately for lines A and B using Eq. (20).

$M_{CUW}$, $h_{CUW,in}$ and $h_{CUW,out}$ are determined in a similar manner to that used to determine the feedwater loop enthalpy and flow. $M_{CUW}$ is determined using differential pressure measurements from flow elements provided in the CUW flow piping. The approach is basically the same as that described for the feedwater loop flow calculation, except a standard value expected for the density can be used for the calculation. Because the contribution of this term to the overall heat balance equation is much smaller than that of the feedwater flow and enthalpy terms, this approximation results in an insignificant impact on the calculated value of $h_{in}$. $h_{CUW,in}$ and $h_{CUW,out}$ are determined from temperature measurements from standard temperature measurement devices installed in thermowells to measure the temperature of the water flow to and from the CUW system. A standard expected pressure value can be used for these calculations with insignificant impact on the calculation of $h_{in}$.

$M_{CRD}$ and $h_{CRD}$ are determined by an approach similar to that used to determine $M_{CUW}$ and $h_{CUW,out}$. A flow element is provided for measurement of the control rod drive (CRD) purge flow. The handling of the differential pressure measurement from the CRD purge flow element and the calculation of $M_{CRD}$ is performed in the same way as the calculation of $M_{CUW}$. $h_{CRD}$ is determined from a temperature measurement made by a standard temperature measurement device installed in a thermowell to measure the temperature of the CRD purge water. A standard expected pressure value can be used for these calculations with insignificant impact on the calculation of $h_{in}$.

$Q_{core}$ is the final term in the heat balance equation that is determined from plant measurements. The plant neutron monitoring system includes four separate divisional channels that calculate the core average power by summing the readings of individual local power range monitor (LPRM) signals multiplied by an appropriate power weighting factor.

The sum of all the weighted LPRM signals is then again multiplied by an appropriate overall weighting factor so that the final resulting value, called the "average power range monitor"(APRM) signal provides a continuous representation of the core fission power level. The process computer system of a BWR plant provides all the required algorithms and capabilities to determine the appropriate weighting factors for the LPRM signals and the APRM signals. Also, from the APRM, a simulated thermal power level signal is formed by applying a first-order lag filter to the APRM signal. The first-order lag is a simplified representation of the nuclear fuel time constant. The resulting signal provides a continuous indication of the thermal power level of the reactor core. The simulated thermal power signals from all four separate divisional channels are provided to the plant process computer system by a multiplexing interface. $Q_{core}$ is calculated by taking the average of all the simulated thermal power signals (each in units of % of rated power) that are judged to be valid (i.e., usually the average of four signals) and dividing it by 100%. Thus if the average simulated thermal power signal is 100% of rated power, $Q_{core}$ is equal to unity.

The remaining terms for the heat balance equation are determined by using reasonable approximations of the nominal values for the following terms: $f_{CU}$, $M_{RIP}$, $h_{RIP}$, $R_L$, $\gamma$ and $Q_P$. As an alternative, $Q_P$ could also be determined by using additional plant measurements than those previously described. Both approaches for determining $Q_P$ will be described. The typical means to determine the nominal value of these terms will now be described.

$f_{CU}$ is required to be less than about 0.0025 for all normal power operating conditions (this is a design requirement on the separator performance). Detailed analytical evaluations have shown that the actual value may be around 0.001. For the heat balance equation, the value of $h_{in}$ is rather insensitive to using any value in the range of 0.001 to 0.0025. Therefore, as a typical nominal value, the value for fcu is chosen to be 0.001 for all heat balance evaluations. If a better nominal estimate is available for a particular plant, that value can be used instead.

$M_{RIP}$ is a very small flow rate compared to the others in the numerator of the second term of the heat balance equation. The purge flow to each reactor internal pump (RIP) is adjusted by observing local instrumentation in the reactor building. Once adjusted, this value will not vary significantly during normal plant operation. Therefore, the specified design nominal value for the total RIP purge flow rate for the applicable plant should be used for the value of $M_{RIP}$.

$h_{RIP}$ is typically very close to the same value as $h_{CRD}$. This is because the same basic water supply source as used for the CRD purge flow is used to supply RIP purge flow. Therefore, the same value as determined for as $h_{CRD}$ can be used for the value of $h_{RIP}$. If a different water supply source for the RIP purge flow is used for a particular plant, a more appropriate nominal value should be used.

$R_L$ can be determined by performing heat transfer calculations of the heat loss through the vessel wall to the surrounding atmosphere in the drywell. Such calculations can be performed using commercially available heat transfer codes. The results for an example plant with a core thermal power rating of 3926 MW (thermal power) yielded a value of around 1.1 MW for the nominal value for $R_L$.

$\gamma$ can be determined by performing analytical calculations of the energy deposited in the water in the downcomer region of the vessel by gamma ray heating and neutron heating. Such calculations can be performed using commercially available nuclear radiation analysis codes. The results for an example plant with a core thermal power rating of 3926 MW (thermal power) yielded a value of around 0.551 MW for the nominal value for $\gamma$.

$Q_P$ can be determined by using the values of the reactor water density and the individual pump flows and the expected total dynamic head of the pump at the measured speed and flow value and the efficiency of the pump at the same conditions. All this data is available from shop performance testing of each RIP. Then the total power added by this individual pump is equal to the total dynamic head multiplied by the flow rate and density then divided by the pump efficiency. A further simplifying assumption that can be used is to calculate the expected value at rated speed of the RIP for the energy added and then assume that this value will vary in direct proportion to the ratio of the measured RIP speed cubed to the rated RIP speed cubed. Because this term is relatively small, such simplifying assumptions can be used without significant impact on the accuracy of the calculation of $h_{in}$. The total value for $Q_P$ is determined by adding the energy added of all running RIPs.

An alternative approach for determination of the energy added by the RIPs is to measure the electrical power provided to each RIP motor (i.e., standard type of electrical measurement based upon measurement of three-phase voltage and current provided to each RIP motor). The total energy added by each RIP is the motor input power multiplied by the efficiency of the RIP motor (this data is also available from shop data) at the measured RIP speed. The total value for $Q_P$ is determined by adding the energy added of all running RIPS. Either this method or the one described in the previous paragraph can be used to determine a reasonable value for $Q_P$.

If one evaluates the relative importance of the accuracy in calculation of the terms in the heat balance equation, the terms that are directly determined from plant measurements play a much more significant role in the final accuracy of the calculation of $h_{in}$. Therefore, the approaches and assumptions for determining $f_{CU}$, $M_{RIP}$, $h_{RIP}$, $R_L$, $\gamma$ and $Q_P$ are judged to be sufficiently accurate and valid for use in the heat balance equation. For a given plant evaluation, other approaches may also be defined for estimating these terms with acceptable overall accuracy on the heat balance equation. The approaches defined here are a possible set of reasonable approaches for estimating these terms.

Thus, in accordance with the method of the present invention, the core inlet enthalpy $h_{in}$ is determined using the core mass flow rate calculated using the pump differential pressure method equation and the measured or assumed values for the other terms in the heat balance equation. Knowing $h_{in}$ and the pressure in the lower plenum region of the vessel (determined from plant pressure measurements), the ASME compressed steam table properties can be used to determine the corresponding reactor water temperature $T_{RW}$ and density $\rho$.

Figure 4:
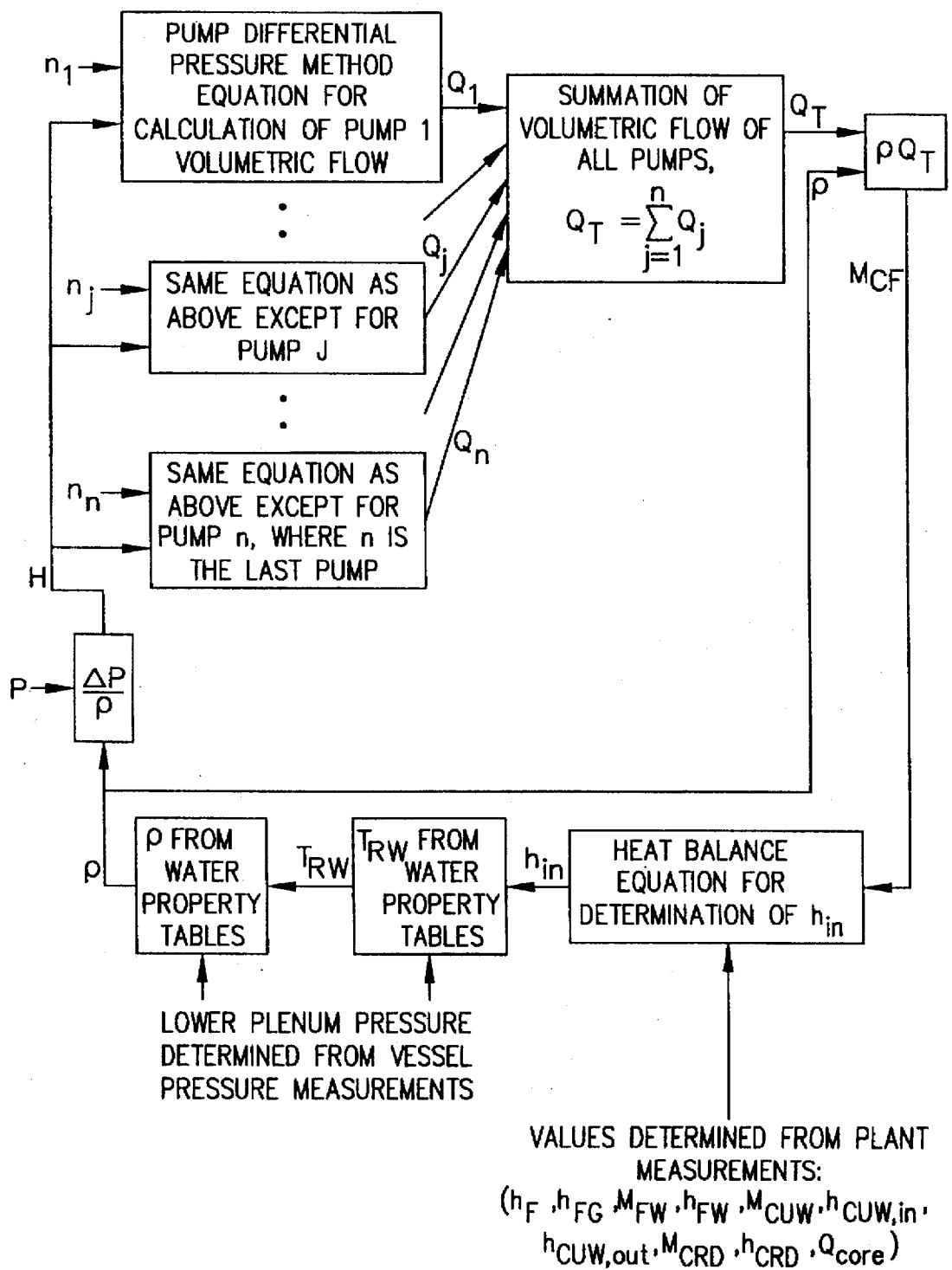
FIG. 4 is a flowchart showing the iterative process for determining the core flow in accordance with the present invention.

Then, using this calculated value for $\rho$, a numerical method such as successive approximation can be used to arrive at an improved estimate for the actual reactor water density $\rho$. Herein we identify the n-th such estimate of the density as $\rho_n$. So $\rho_1$ corresponds to the initial estimate obtained using the reactor water temperature measurement value. The second estimate $\rho_2$ is obtained using the heat balance equation, as described hereinabove. Then a new value for the core mass flow rate can be obtained from the pump differential pressure equations using the new density value, and the heat balance equation is used again to obtain a new value for the core inlet enthalpy and density. This iterative process, which is depicted in FIG. 4, is continued until the difference in the calculated core flow and density between successive approximations becomes very small (e.g., <0.1% of the equivalent rated values). The resulting converged values for core mass flow rate, and reactor water temperature and density provide for much improved accuracy in determination of these important reactor values.

Using the above-described method for obtaining more accurate values for the core mass flow rate, a boiling water nuclear reactor can be operated at a desired core mass flow rate. The method of reactor operation in accordance with the present invention comprises the following steps: (a) before startup, predicted values for core plate differential pressure at a multiplicity of core power/core mass flow rate points are generated using conventional analytical computer codes which model reactor operation; (b) coefficients of a quadratic relation for core mass flow rate between core power and core plate differential pressure are then determined based on the predicted values for core plate differential pressure; (c) after startup, core plate differential pressure, pump differential pressure and core power are measured at each of a multiplicity of sampling times and reactor operating conditions; (d) then a final value for the core mass flow rate at each sampling time is determined; (e) the coefficients of the quadratic relation are then adjusted using the final values for the core mass flow rate; and (f) the reactor is operated at a core plate differential pressure and a core power which, when inserted into the quadratic equation with adjusted coefficients, give a core mass flow rate value substantially equal to the desired core mass flow rate.

The foregoing preferred embodiment of the method of the invention has been disclosed for the purpose of illustration. Other variations and modifications will be apparent to persons skilled in the art of nuclear reactor monitoring. All such variations and modifications are intended to be encompassed by the claims set forth hereinafter.

We claim:

1. A method for estimating the core flow rate in a boiling water reactor having a multiplicity of internal pumps between a core shroud and a reactor pressure vessel, comprising the steps of:

(a) determining a value representing a reactor water temperature inside the reactor;

(b) deriving an initial value for the reactor water density from the determined value for reactor water temperature;

(c) measuring a pump differential pressure and a pump speed for each internal pump;

(d) determining a pressure in a lower plenum region based upon measurement of the reactor pressure vessel pressure;

(e) using a pump differential pressure method to calculate a value for a total core mass flow rate as a function of the initial value of the reactor water density and the measured pump differential pressure and measured pump speed for each internal pump;

(f) using a heat balance equation to determine a value for an enthalpy of a core inlet flow as a function of the total core mass flow rate value calculated in step (e) and measured or assumed values for other terms in said heat balance equation;

(g) deriving an improved value for the reactor water density from the value for core inlet flow enthalpy determined in step (f), the measured value for the pressure in the lower plenum region of the reactor pressure vessel and compressed steam table properties;

(h) using said pump differential pressure method to calculate an improved value for the total core mass flow rate as a function of the improved value of the reactor water density derived in step (g) and the measured pump differential pressure and measured pump speed for each internal pump;

(i) using said heat balance equation to determine an improved value for the core inlet flow enthalpy as a function of the improved value for the total core mass flow rate calculated in step (h) and said measured or assumed values for said other terms in said heat balance equation;

(j) deriving a further improved value for the reactor water density from the improved value for core inlet flow enthalpy determined in step (i), the previously determined value for the pressure in the lower plenum region of the reactor pressure vessel and compressed steam table properties; and (k) repeating steps (h), (i) and (j) until the difference in the improved values for the core mass flow rate and the reactor water density between successive approximations is less than a predetermined amount.

2. The method as defined in claim 1, further comprising the steps of:

(l) measuring a differential pressure across a core plate of the reactor at each of a multiplicity of sampling times and reactor operating conditions;

(m) measuring a core power at each of said multiplicity of sampling times and reactor operating conditions;

(n) acquiring a final value for the core mass flow rate at each of said multiplicity of sampling times in accordance with steps (h)–(k); and (m) using the final values for the core mass flow rate to correlate core mass flow rate to the measured values of the core plate differential pressure and core power.

3. In a boiling water nuclear reactor, a process for estimating core flow rate, comprising the steps of:

(a) measuring a differential pressure across a core plate of the reactor at each of a multiplicity of sampling times and reactor operating conditions;

(b) measuring a core power at each of said multiplicity of sampling times and reactor operating conditions;

(c) determining a final value of a core mass flow rate at each of said multiplicity of sampling times; and (d) using the final values for the core mass flow rate to correlate core mass flow rate to the measured values of the core plate differential pressure and core power, wherein each final value of the core mass flow rate is acquired by an iterative process involving successive approximations using a pump differential pressure method to derive a core mass flow rate approximation and a heat balance equation to derive a reactor water density approximation in alternating sequence.

4. The method as defined in claim 3, wherein step (c) comprises the steps of:

(e) determining a pressure in a lower plenum region based upon measurement of the reactor pressure vessel pressure;

(f) deriving an initial value for the reactor water density from the determined value for reactor water temperature;

(g) measuring a pump differential pressure and a pump speed for each internal pump;

(h) measuring a pressure in a lower plenum region of a reactor pressure vessel;

(i) using a pump differential pressure method to calculate a value for a total core mass flow rate as a function of the initial value of the reactor water density and the measured pump differential pressure and measured pump speed for each internal pump;

(j) using a heat balance equation to determine a value for an enthalpy of a core inlet flow as a function of the total core mass flow rate value calculated in step (i) and measured or assumed values for other terms in said heat balance equation;

(k) deriving an improved value for the reactor water density from the value for core inlet flow enthalpy determined in step (j), the previously determined value for the pressure in the lower plenum region of the reactor pressure vessel and compressed steam table properties;

(l) using said pump differential pressure method to calculate an improved value for the total core mass flow rate as a function of the improved value of the reactor water density derived in step (k) and the measured pump differential pressure and measured pump speed for each internal pump;

(m) using said heat balance equation to determine an improved value for the core inlet flow enthalpy as a function of the improved value for the total core mass flow rate calculated in step (l) and said measured or assumed values for said other terms in said heat balance equation;

(n) deriving a further improved value for the reactor water density from the improved value for core inlet flow enthalpy determined in step (m), a measured value for a pressure in a lower plenum region of the reactor pressure vessel and compressed steam table properties; and (o) repeating steps (l), (m) and (n) until the difference in the improved values for the core mass flow rate and the reactor water density between successive approximations is less than a predetermined amount.

5. A method for operating a boiling water nuclear reactor at a desired core mass flow rate, comprising the steps of:

(a) before startup, generate predicted values for core plate differential pressure at a multiplicity of core power/core mass flow rate points using analytical computer codes which model reactor operation;

(b) determine coefficients of a quadratic relation for core mass flow rate between core power and core plate differential pressure based on said predicted values for core plate differential pressure;

(c) after startup, measure core plate differential pressure, pump differential pressure and core power at each of a multiplicity of sampling times;

(d) determining a final value of a core mass flow rate at each of said multiplicity of sampling times;

(e) adjusting the coefficients of said quadratic relation using the final values for the core mass flow rate; and (f) operating the reactor at a core plate differential pressure and a core power which, when inserted into said quadratic equation with adjusted coefficients, give a core mass flow rate value substantially equal to said desired core mass flow rate, wherein each final value of the core mass flow rate is acquired by an iterative process involving successive approximations using a pump differential pressure method to derive a core mass flow rate approximation and a heat balance equation to derive a reactor water density approximation in alternating sequence.

6. The method as defined in claim 5, wherein step (d) comprises the steps of:

(g) determining a value representing a reactor water temperature inside the reactor;

(h) deriving an initial value for the reactor water density from the determined value for reactor water temperature;

(i) measuring a pump differential pressure and a pump speed for each internal pump;

(j) determining a pressure in a lower plenum region based upon measurement of the reactor pressure vessel pressure;

(k) using a pump differential pressure method to calculate a value for a total core mass flow rate as a function of the initial value of the reactor water density and the measured pump differential pressure and measured pump speed for each internal pump;

(l) using a heat balance equation to determine a value for an enthalpy of a core inlet flow as a function of the total core mass flow rate value calculated in step (k) and measured or assumed values for other terms in said heat balance equation;

(m) deriving an improved value for the reactor water density from the value for core inlet flow enthalpy determined in step (l), the previously determined value for the pressure in the lower plenum region of the reactor pressure vessel and compressed steam table properties;

(n) using said pump differential pressure method to calculate an improved value for the total core mass flow rate as a function of the improved value of the reactor water density derived in step (m) and the measured pump differential pressure and measured pump speed for each internal pump;

(o) using said heat balance equation to determine an improved value for the core inlet flow enthalpy as a function of the improved value for the total core mass flow rate calculated in step (n) and said measured or assumed values for said other terms in said heat balance equation;

(p) deriving a further improved value for the reactor water density from the improved value for core inlet flow enthalpy determined in step (o), a measured value for a pressure in a lower plenum region of the reactor pressure vessel and compressed steam table properties; and (q) repeating steps (n), (o) and (p) until the difference in the improved values for the core mass flow rate and the reactor water density between successive approximations is less than a predetermined amount.

* * * * *